US008934452B2

(12) United States Patent
Zou

(10) Patent No.: US 8,934,452 B2
(45) Date of Patent: Jan. 13, 2015

(54) METHOD, APPARATUS AND COMPUTER READABLE MEDIUM FOR TIMING ALIGNMENT IN OVERLAID HETEROGENEOUS WIRELESS NETWORKS

(75) Inventor: Jialin Zou, Randolph, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 262 days.

(21) Appl. No.: 13/551,088

(22) Filed: Jul. 17, 2012

(65) Prior Publication Data

US 2014/0023035 A1 Jan. 23, 2014

(51) Int. Cl.
*H04W 56/00* (2009.01)

(52) U.S. Cl.
USPC .......... 370/331

(58) Field of Classification Search
CPC .......... H04W 56/0045
USPC .......... 370/331, 350
See application file for complete search history.

(56) References Cited

U.S. PATENT DOCUMENTS

| | | | | |
|---|---|---|---|---|
| 7,493,129 | B1 * | 2/2009 | Mostafa et al. | 455/502 |
| 2010/0220712 | A1 * | 9/2010 | Zhang et al. | 370/350 |
| 2010/0222068 | A1 | 9/2010 | Gaal et al. | |
| 2011/0153869 | A1 * | 6/2011 | Bryant et al. | 709/248 |
| 2012/0163299 | A1 * | 6/2012 | Chen et al. | 370/328 |
| 2013/0294418 | A1 * | 11/2013 | Vukovic et al. | 370/336 |
| 2014/0029586 | A1 * | 1/2014 | Loehr et al. | 370/336 |
| 2014/0086221 | A1 * | 3/2014 | Davydov et al. | 370/336 |
| 2014/0133477 | A1 * | 5/2014 | Siomina et al. | 370/350 |

OTHER PUBLICATIONS

International Search Report for Application No. PCT/US2013/050037 dated Nov. 8, 2013.

Huawei: "Summary of offline discussions on CSI-RSRP measurements for CoMP", 3GPP draft; R1-123014 Summary of Offline Discussions on CSI-RSRP Measurements for COMP, 3rd Generation Partnership Project (3GPP), Mobile Competence Centre; 650, Route Des Lucioles; F-06921 Sophia-Antipolis Cedex; France, vol. Ran WG1, No. Prague, Czech Republic; 20120521-20120525, May 25, 2012.

Huawei et al.: "Uplink timing advance for CoMP", 3GPP draft; R1-120991 3rd Generation Partnership Project (3GPP), Mobile Competence Centre; 650, Route Des Lucioles; F-06921 Sophia-Antipolis Cedex; France, vol. Ran WG1, No. Jeju, Korea; 20120326-20120330, Mar. 20, 2012.

* cited by examiner

*Primary Examiner* — Paul H Masur
(74) *Attorney, Agent, or Firm* — Harness, Dickey & Pierce

(57) ABSTRACT

The apparatus includes a base band unit including a processor. The processor is configured to receive a first message, the first message including information identifying a remote radio head and a first time delay, the first time delay indicating a propagation time delay between a user equipment and a base station, receive a second message, the second message indicating the user equipment is associated with the remote radio head, receive a reference signal, the reference signal including a time stamp, determine a second time delay based on the time reference, the second time delay indicating a propagation time delay between the user equipment and the base band unit, determine a time value based on the first time delay and the second time delay, and transmit a data packet to the user equipment via the remote radio head, the transmitting being advanced in time by the time value.

15 Claims, 7 Drawing Sheets

METHOD, APPARATUS AND COMPUTER READABLE MEDIUM FOR TIMING ALIGNMENT IN OVERLAID HETEROGENEOUS WIRELESS NETWORKS

BACKGROUND OF THE INVENTION

1. Field

Embodiments relate to timing alignment of remote radio heads (RRH) with macro base stations in overlaid macro cell heterogeneous wireless networks.

2. Related Art

Heterogeneous wireless networks (HetNets) are deployments of cells with differing coverage radii within a single geographic area. A typical configuration is one where macro (e.g., large) cells provide contiguous coverage over the area while pico, femto or metro (e.g., small) cells cover smaller areas that are associated with either traffic hot spots or coverage holes. When both the macro cells and metro cells share the same carrier frequency, the deployment is called a co-channel or shared-carrier deployment.

For example, a HetNet may include macro base stations (BSs) and metro BSs. Macro BSs provide wireless coverage for user equipment (UEs) within the macro cells which may cover large geographical areas, while metro BSs may provide wireless coverage for UEs located in the metro cells which may cover smaller geographical areas within the coverage area of a macro BS. Parameters needed to configure BSs within HetNets include patterns for and allocation of an almost blank subframe (ABS).

SUMMARY OF THE INVENTION

One embodiment includes a base band unit. The base band unit includes a processor. The processor is configured to receive a first message from a base station, the first message including information identifying a remote radio head and a first time delay, the first time delay indicating a propagation time delay between a user equipment and the base station, receive a second message from a user equipment, the second message indicating the user equipment is associated with the remote radio head, receive a reference signal from the user equipment, the reference signal including a time stamp, determine a second time delay based on the time reference, the second time delay indicating a propagation time delay between the user equipment and the base band unit, determine a time value based on the first time delay and the second time delay, and transmit a data packet to the user equipment via the remote radio head, the transmitting being advanced in time by the time value.

Another embodiment includes a wireless user equipment. The wireless user equipment includes a processor. The processor is configured to receive a signal indicating the user equipment is proximate to a remote radio head, transmit a first message to a base station, the message including identifying information associated with the remote radio head, transmit a reference signal to the base station, the reference signal including a first time reference, the first time reference indicating a transmission time from the user equipment to the base station, and receive a data packet from the remote radio head, a time advance associated with the transmission of the data packet being based on the first time reference.

Another embodiment includes a base station. The base station includes a processor. The processor is configured to receive a first message from a user equipment, the first message including identifying information associated with a remote radio head, receive a reference signal from a user equipment, the reference signal including a first time reference, the first time reference indicating a transmission time from the user equipment to the base station, determine a time delay associated with the remote radio head based on the first time reference, and transmit a second message to a base band unit, the message including the identifying information and the time delay.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1A:
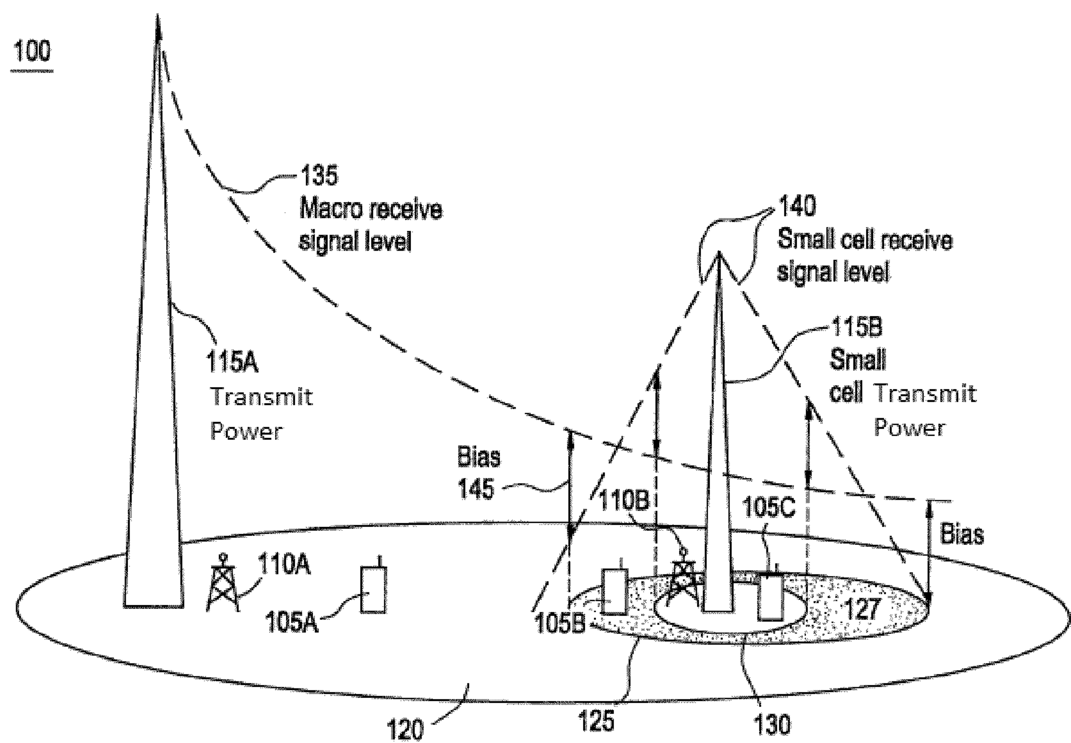
FIG. 1A is a diagram illustrating a portion of a wireless communications network according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Overview of Network Architecture

FIG. 1A illustrates a portion of a wireless communications network 100. Referring to FIG. 1A, wireless communications network 100 may follow, for example, a Long Term Evolution (LTE) protocol. Communications network 100 includes a macro base station (BS) 110A; a small cell BS 110B; a macro cell 120, a small cell 125; and first through third UEs 105A-C. The small cell 125 may be, for example a remote radio head (RRH), pico cell, a femto cell or a metro cell. Further, the term small cell as used herein may be considered synonymous to and/or referred to as RRH, pico cell, a femto cell or a metro cell. The small cell 125 includes a cell range extended area (CRE) 127 and an in-cell area 130.

In the example illustrated in FIG. 1A, the first UE 105A is attached to the macro cell 120, and the second and third UEs 105B and 105C are attached to the small cell 125. Further, the second UE 105B is designated as a CRE UE and the third UE 105C is designated as an in-cell UE.

Though, for the purpose of simplicity, communications network 110 is illustrated as having only macro BS 110A, small cell BSs 110B, and first through third UEs 105A-C, communications network 100 may have any number of macro BSs, small cell BSs and UEs. Further, the macro BS 110A and small cell BS 110B may be connected to other core network elements included in the communications network 100 including, for example, one or more mobility management entities (MME) and/or one or more operations, administration and management (OAM) nodes (not shown). Further, the MME may include the OAM node.

The macro BS 110A may be, for example, an evolved nodeB (eNB) providing wireless coverage for UEs within the macro cell 120. The small cell BS 110B may be, for example, an eNB underlaid with respect to the macro BS 110A. The small cell BS 110B may provide wireless coverage for UEs associated with the small cell 125 that supplements coverage provided by the macro BS 110A. Data, control signals and other information described herein as be sent and/or received by the macro cell 120 may be sent and/or received by the macro BS 110A. Further, operations described herein as being performed by the macro cell 120 may be performed by the macro BS 110A. Data, control signals and other information described herein as be sent and/or received by the small cell 120 may be sent and/or received by the small cell BS 110B. Further, operations described herein as being performed by the small cell 125 may be performed by the small cell BS 110B.

In general a transmit power of the macro BS 110A may be greater than a transmit power of the small cell BS 110B. Transmit powers 115A and 115B illustrate an example of the relative transmit powers of the macro BS 110A and the small cell BS 110B, respectively. Macro receive signal level 135 illustrates an example of a strength of a receive signal of the macro cell 120 measured by UEs within communications network 100. As is illustrated in FIG. 1A, in general, the strength of the macro receive signal level may drop as a distance from a location of the macro BS 110A increases. Small cell receive signal level 140 illustrates an example of a strength of a receive signal of the small cell 125 measured by UEs within communications network 100.

As one skilled in the art will appreciate (and indicated above), a small cell may be a pico, micro or metro cell, as well as a RRH. As one skilled in the art will appreciate, a BS (macro or small) may be a logical entity that incorporates transmitter and receiver functionality. Therefore, a base station may be physically embodied as a group of remote RF transmitting and receiving antennas. Each antenna may have an associated remote radio heads (RRHs). The logical entity may include a RRH centralized baseband cage (typically remote to the antenna). Example embodiments may be implemented in other physical arrangements familiar to those skilled in the art. A physical transmitting antenna may correspond to one or more coverage cells. Therefore a logical BS may be associated with more than one cell. The terms base station (BS) and RRH may be used interchangeably in the descriptions below.

In HetNet development, not limiting a Base Band Unit (BBU) to those only collocated with the macro cell BS (e.g., macro BS 110A) may be desirable. A centralized BBU may connect and process hundreds of RRHs. The coverage of a centralized BBU may include many macro cells. With a significant increase in the geographic coverage area of a BBU, there may be an RRH physically located far away from the BBU and located in a different macro cell than the BBU. Typically, a route of a fiber optic inter-connection from the BBU to a RRH is not a straight line and is longer than the line of sight distance from the BBU to the RRH. Further, the media of the fiber optic inter-connection will slow down the propagation of the light compared with the free space. In addition, the propagation of the light in the fiber optics depends on the total internal reflection. As a result, the actual propagation distance in the fiber is much longer than the length of the fiber. In general, the delay for light traveling within fiber of a given length is about twice that of the radio wave over the same distance in the air.

Figure 1B:
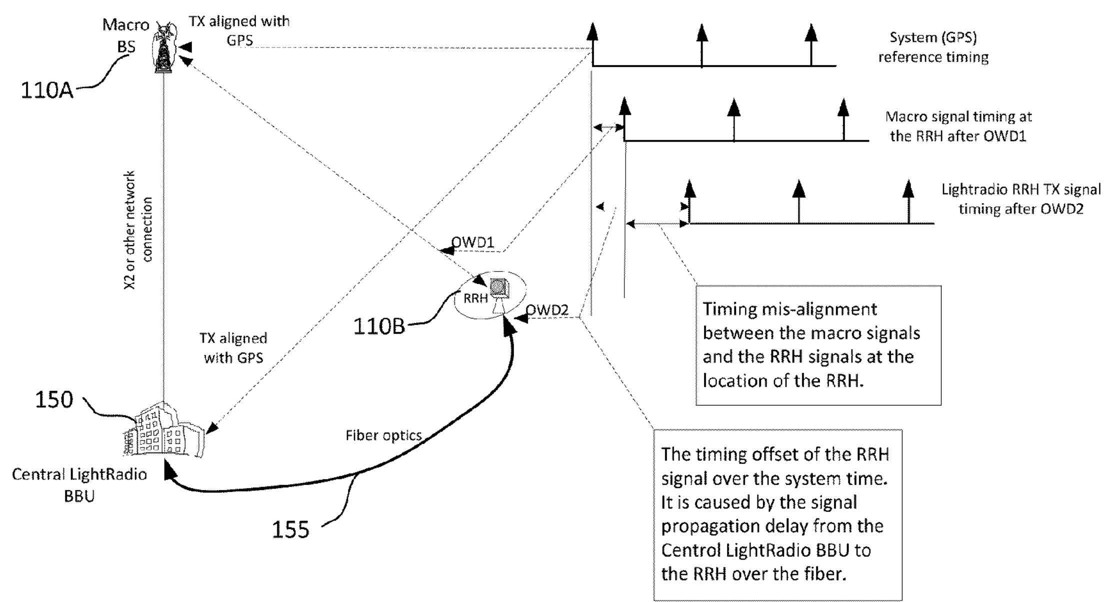
FIG. 1B is a diagram illustrating a portion of a wireless communications network 100 together with an associated timing diagram according to an example embodiment.

FIG. 1B illustrates a portion of a wireless communications network 100 together with an associated timing diagram according to an example embodiment. As shown in FIG. 1B, assuming both macro BS 110A and BBU 150 are in sync with the system time (e.g. global positioning system (GPS) system time), if the signals sent by the macro BS 110A and BBU 150 are aligned with the system timing, after the BBU signal has arrived at the RRH 110B there may be a timing offset between the RRH transmitted signals and the umbrella macro cell's signals arriving at the location of the RRH.

For example, if a RRH 110B is located 1500 m away from the macro BS 110A, the propagation delay from the macro BS 110A to the RRH 110B may be approximately 5 us. If the BBU 150 to the RRH 110B is about 4 km and 4.5 km of fiber optic inter-connection 155 may be used to connect the BBU 150 and the RRH 110B, the experienced propagation delay from the BBU 150 to the RRH 110B is that for light traveling over 9 km, which is approximately 30 us. Therefore, the timing offset between the macro BS signals and RRH signals at the location around the RRH 110B will be approximately 25 us. The timing offset is more than the cyclic prefix period of 4.69 us. Therefore, the timing offset may not meet the synchronization requirements for Multimedia. Broadcast Multicast Services (MBMS), macro/RRH-diversity or multi-streaming.

In order to meet the synchronization requirements, the RRH signals should be aligned with the macro BS signals. The first step is to get the propagation delay from BBU 150 to RRH 110B measured. There are many network functions that also require accurate timing offsets between the umbrella macro cells and RRH 110B. For example, eICIC with ABS, uplink (UL) interference cancelation, Comp, etc. Example embodiments provide a method to determine the timing offset between the umbrella macro BS signals and the RRH signals and to synchronize the RRH 110B, linked with the BBU 150 (which may be some distance away from the RRH 110B), with the umbrella macro cell.

Example Implementation

A mobile device (e.g., UE 105) may be used to assist the calibration for RRH synchronization with a macro cell. The mobile device may be initially connected to an umbrella macro cell. If the mobile device is in close proximity to the RRH (e.g., RRH 110B), the mobile device may report to the macro BS (e.g., BS 110A) information about the identity of the RRH. At the same time, the macro BS determines a one way delay (OWD) from the macro BS to the mobile, which approximately is the OWD from the macro BS to the RRH. Then the macro BS directs the mobile device to perform a handover to the RRH and maintains the connection with RRH. This will allow the BBU (e.g., BBU 150) to determine the OWD from the BBU to the mobile. Because the mobile is very close to the RRH, approximately it is the OWD from the BBU to the RRH. The OWD from the macro BS to the RRH is also communicated to the BBU through the wired connection and standard interface between the BBU and macro BS, e.g., X2. The BBU may perform a timing advance such that the RRH signal is aligned with the macro BS signals at the location of the RRH based on both of the OWD's.

According to example embodiments, the macro BS's (e.g., BS 110A) are synchronized with a system time (for example the GPS system time). A central BBU (e.g., BBU 150), connected to a plurality of co-channel RRHs overlaid with different macro cells, is also tracking and synchronized with the system time. Before RRH calibration is performed, the transmission timing of that RRH is aligned with the system time at the BBU. Determining the macro/RRH timing offset is then conducted.

Figure 2:
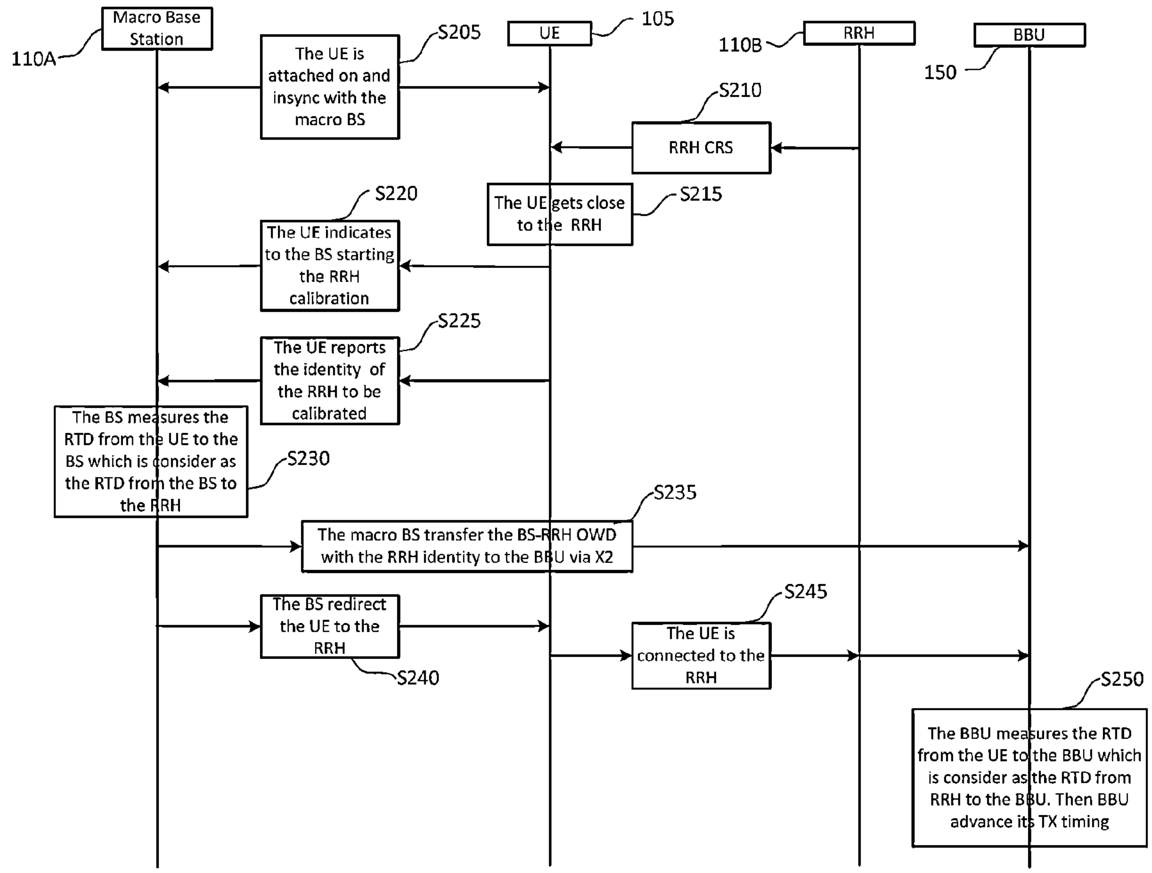
FIG. 2 illustrates a method for timing alignment (synchronization) in the network of FIGS. 1A and 1B according to an example embodiment.

FIG. 2 illustrates a method for timing alignment (synchronization) in the network of FIGS. 1A and 1B according to an example embodiment. While describing the steps of the method associated with FIG. 2, reference will be made to the wireless network 100 of FIGS. 1A and 1B. In the method associated with FIG. 2, each device may include a processor and a memory which operate together to run device functionality. For example, the memory may store code segments regarding apparatus functions. The code segments may in-turn be executed by the processor. Further, the memory may store process variables and constants for use by the processor.

In step S205 the UE 105 is attached on and in sync with macro BS 110A. For example, UE 105 and macro BS 110A are synchronized with respect to a system time. The UE 105 is attached with macro BS 110A using any known wireless standard (e.g., Long Term Evolution (LTE) standard) as discussed in more detail above.

In step S210 the RRH 110B broadcasts a Common Reference Signal (CRS). For example, a CRS may be a reference signal transmitted by base stations continuously for UEs to be in synch with the BS. The RRH 110B may broadcast the CRS such that any nearby UE may receive signals from the RRH and the UE may be synchronized with the RRH. The CRS also enables the UE to measure the signal strength of the RRH.

In step S215 the UE 105 moves into close proximity with the RRH 110B. Typically, when the UE 105 is in close proximity to the RRH 110B, the macro BS 110A will instruct the UE 105 to handover to the RRH 110B. However, according to example embodiments the macro BS 110A may not instruct the UE 105 to handover to the RRH 110B before calibration. The macro BS 110A will make the decision based on a record set (e.g., list of RRH cell IDs or other identifier) of uncalibrated RRHs.

According to example embodiments, the BBU 150 may not be co-located with the macro BS 110A. Further, the BBU 150 may have started transmission for the co-channel RRH to be adjusted. The timing of the transmission at the BBU 150 is aligned with the system time. The ABS with a pattern for calibration, e.g. no any data transmission before the calibration, is enabled at the RRH. The ABS pattern could be pre-configured to the UE 105 for calibration only or delivered to the UE 105 by the macro BS 110A.

In step S220 the UE 105 transmits a message to the macro BS 110A, the message indicates the starting of a RRH calibration. The message may be of any known message type used by a wireless standard (e.g., LTE standard).

The UE 105 may be close to the RRH 110B (e.g., a few meters). Because the UE 105 is so close to the RRH 110B, the one way delay (OWD) from the macro BS 110A to the UE 105 can be considered as the OWD from the macro BS 110A to the RRH 110B (the delay from the UE 105 to the RRH 110B is comparatively small and is ignored). Further, the OWD from the BBU 150 to the UE 105 may be considered as the OWD from the BBU 150 to the RRH 110B.

The starting calibration notification to the macro BS 110A may be triggered by the UE 105. For example, UE 105 may include a calibration application that is controlled by the user (e.g., a service technician). Alternatively, UE 105 may include a calibration application that is position triggered (e.g., by an associated global position system (GPS) signal). The UE 105 may report a power measurement from the RRH 110B for macro BS 110A to verify the distance from the UE 105 to the RRH 110B.

In step S225 the UE 105 transmits a message to the macro BS 110A, the message reports the identity of the RRH to be calibrated. For example, the UE 105 may report information for identifying the RRH 110B. For example, the cell ID if the RRH 110B has a cell ID. If the RRH 110B does not have a cell ID, the associated reference signal offset of the RRH 110B may be reported. Additional information such as current UE 105 location (e.g., based on the aforementioned GPS signal) may also be reported to the macro BS 110A. To avoid the interference from the RRH 110B, the UE 105 may send its report to the macro BS 110A during a known Almost Blank Sub-frame (ABS) time slot(s).

In step S230 the macro BS 110A measures round trip delay (RTD) from the UE 105 to the macro BS 110A and sets the RTD as a RTD from macro BS to RRH (RTD1). The macro BS 110A measures round trip delay using known measurement mechanisms. The One Way Delay (OWD) is obtained from the half of RTD. The OWD is designated as the OWD from the macro BS 110A to the RRH 110B which is denoted as OWD1 in FIG. 1B and is used in the calculation described below.

In step S235 the macro BS 110A transmits a message to the BBU 150, the message includes the macro BS to RRH OWD with the associated RRH identity. For example, the macro BS 110A may send the OWD1 together with the identity information (of the RRH 110B) to the BBU 150 via message using a known X2 communication protocol.

In step S240 the macro BS 110A instructs the UE 105 to redirect (handover) to the RRH 110B. Macro BS 110A executes a known handover process using a known wireless standard (LTE standard) as discussed in more detail above.

In step S245 the UE 105 transmits a message to RRH 110B and the BBU 150, the message informs the RRH 110B and the BBU 150 that the UE 105 is connected to the RRH 110B. UE 105 transmits a known message using a known wireless standard (LTE standard) as discussed in more detail above, the message indicating the handover is complete.

In step S250 the BBU 150 measures the RTD from the UE 105 to the BBU 150 and sets the RTD as a RTD from RRH to BBU (RTD2) and sets an advance transmission (TX) timing for RRH 110B based on the RTD1 and the RTD2. The RTD is converted to the OWD (1/2 RTD) from the macro RRH 150 to the BBU 150 and is denoted as OWD2 in FIG. 1B and is used in the calculation described below.

The BBU 150 may determine the advance transmission (TX) timing (e.g., the timing offset between the macro BS 110A signal and the RRH signal) as TimingOffset21=OWD2−OWD1. Further, according to example embodiments, the BBU 150 may store a plurality of records for a plurality of RRH's, the plurality of records may include TimingOffset21 and identity information for each RRH.

The BBU 150 then may adjust transmission timing associated with RRH 110B to advance by the value TimingOffset21 relative to the system time. As a result, when the same content from both the macro BS 110A and the RRH 110B should be received at the same time (time aligned) by a UE at the border area between the RRH-small-cell and the macro cell, the advance transmission at the BBU 150 through RRH 110B may compensate the propagation delay from the BBU 150 to the RRH 110B. The signals sent over the air from the RRH 110B may be aligned with the macro signal.

In a related example embodiment, after transmission timing advance is applied at the BBU, the value of the Timing Advance (TA) sent from the BBU 150 to each UE 105 via RRH(s) 110B will be different. In the known (e.g., LTE) standards, the BS is required to transmit TA periodically to UEs. The TA value is TimingOffset21.

The macro cell and RRH timing alignment method is described under the scenario that macro cell and RRH share the same frequency channel. However, the method may also be used in cases where macro cell and the RRH use different frequency carriers should there be a timing alignment requirement.

After BBU applied the timing advance_TimingOffset21=OWD2–OWD1, if a UE is in the RRH coverage and tracking the RRH reference signal, the UE's local reference time will be aligned with the system time+OWD1. Then the TA value now should be OWD2+OWD1 plus the RTD from the UE to the RRH (very small). The exact TA value can be determined at BBU based on the comparison between the system time and the timing of received UE signal through RRH.

Brief Hardware Description

Figure 3:
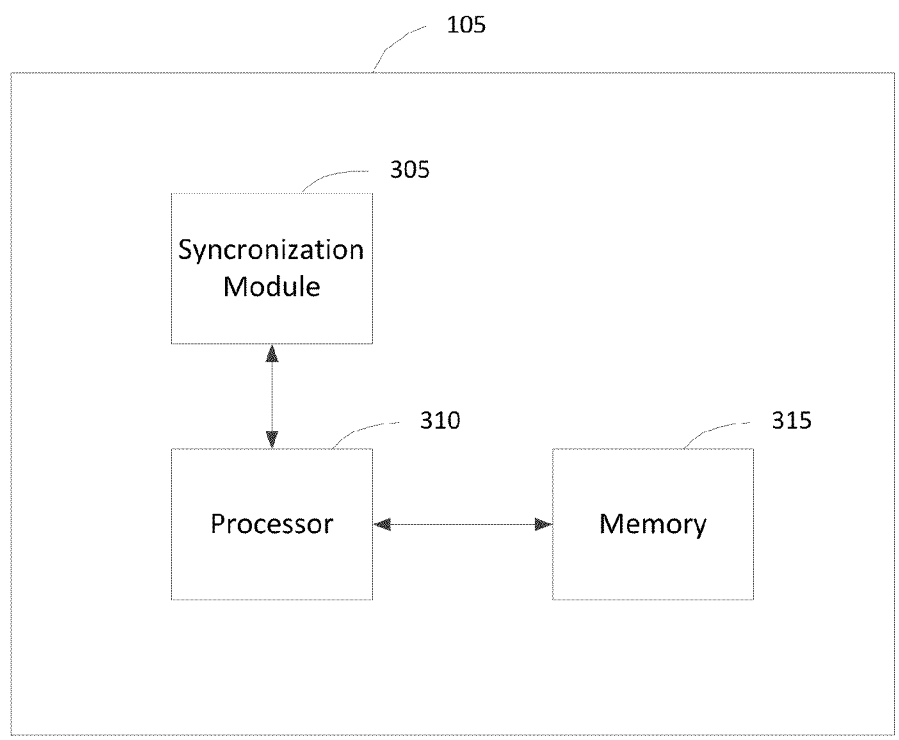
FIG. 3 illustrates a user equipment (UE) according to an example embodiment.

FIG. 3 illustrates a user equipment (UE) according to an example embodiment. As shown in FIG. 3, the UE 105 includes, at least, a synchronization module 305, a processor 310 and a memory 315. The processor 310 and the memory 315 operate together to run UE functionality. For example, the memory 315 may store code segments regarding UE functions (e.g., data transfer, control information signaling/handling and the like). The code segments may in-turn be executed by the processor 310. Further, the memory 315 may store process variables and constants for use by the processor 310. Additional details regarding the processor 310 and the memory 315 are known to those skilled in the art and will not be discussed further for the sake of brevity.

The synchronization module 305 may be hardware including an additional processor (not shown). For example, the synchronization module 305 may be an application specific integrated circuit (ASIC) including self-contained hardware elements (e.g., a processor and a memory) configured to perform reselection functions as, for example software instructions. Alternatively, or in addition to, the synchronization module 305 may be a software module configured to co-operate with the processor 310 and the memory 315 in order to execute reselection functions.

The synchronization module 305 may be configured to perform timing alignment of remote radio heads (RRH) with macro bases stations as discussed above with regard to FIG. 2.

Figure 4:
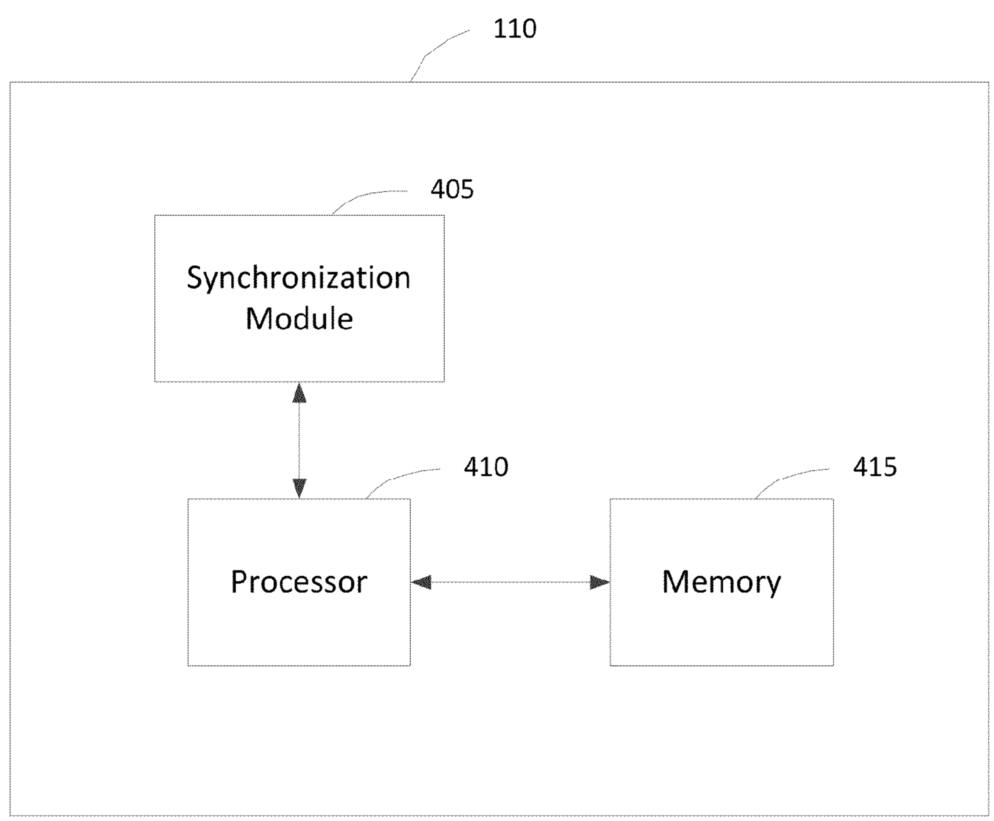
FIG. 4 illustrates a base station (BS) according to an example embodiment.

FIG. 4 illustrates a base station (BS) according to an example embodiment. As shown in FIG. 4, the BS 110 includes, at least, a synchronization module 405, a processor 410 and a memory 415. The processor 410 and the memory 415 operate together to run BS functionality. For example, the memory 415 may store code segments regarding BS functions (e.g., data transfer, control information signaling/handling and the like). The code segments may in-turn be executed by the processor 410. Further, the memory 415 may store process variables and constants for use by the processor 410. Additional details regarding the processor 410 and the memory 415 are known to those skilled in the art and will not be discussed further for the sake of brevity.

The synchronization module 405 may be hardware including an additional processor (not shown). For example, the synchronization module 405 may be an application specific integrated circuit (ASIC) including self-contained hardware elements (e.g., a processor and a memory) configured to perform reselection functions as, for example software instructions. Alternatively, or in addition to, the synchronization module 405 may be a software module configured to co-operate with the processor 410 and the memory 415 in order to execute reselection functions.

The synchronization module 405 may be configured to perform timing alignment of remote radio heads (RRH) with macro bases stations as discussed above with regard to FIG. 2.

Figure 5:
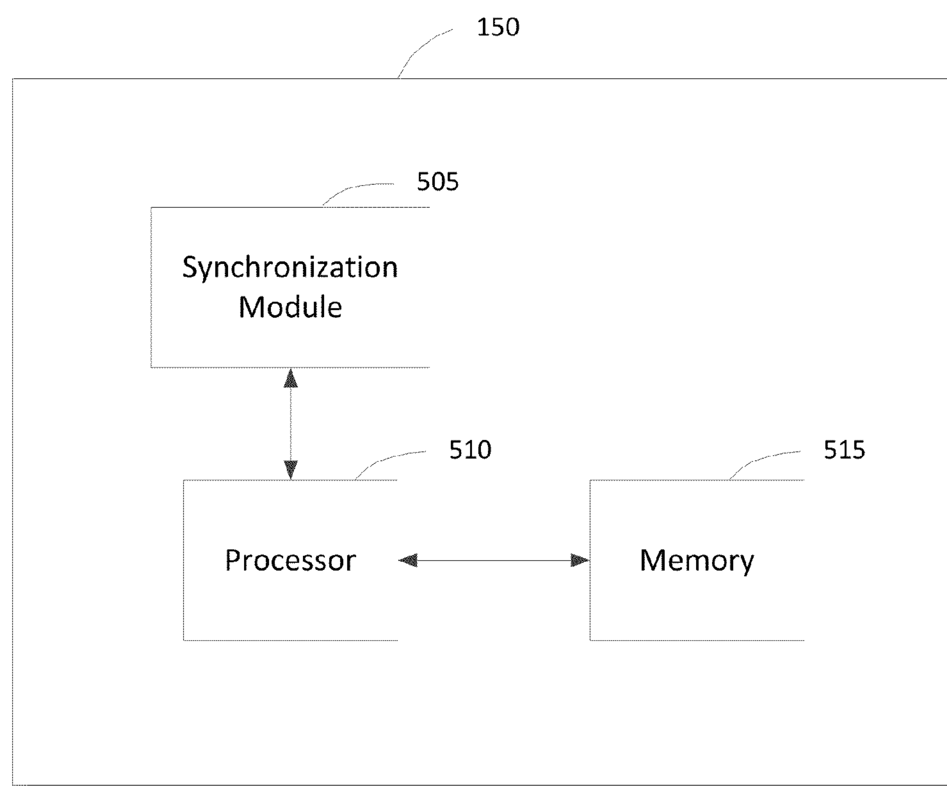
FIG. 5 illustrates a base band unit (BBU) according to an example embodiment.

FIG. 5 illustrates a base band unit (BBU) according to an example embodiment. As shown in FIG. 5, the BBU 150 includes, at least, a synchronization module 505, a processor 510 and a memory 515. The processor 510 and the memory 515 operate together to run BBU functionality. For example, the memory 515 may store code segments regarding BBU functions (e.g., data transfer, control information signaling/handling and the like). The code segments may in-turn be executed by the processor 510. Further, the memory 515 may store process variables and constants for use by the processor 510. Additional details regarding the processor 510 and the memory 515 are known to those skilled in the art and will not be discussed further for the sake of brevity.

The synchronization module 505 may be hardware including an additional processor (not shown). For example, the synchronization module 505 may be an application specific integrated circuit (ASIC) including self-contained hardware elements (e.g., a processor and a memory) configured to perform reselection functions as, for example software instructions. Alternatively, or in addition to, the synchronization module 505 may be a software module configured to co-operate with the processor 510 and the memory 415 in order to execute reselection functions.

The synchronization module 505 may be configured to perform timing alignment of remote radio heads (RRH) with macro bases stations as discussed above with regard to FIG. 2.

Conclusion

Example embodiments provide methods and apparatus for timing alignment of remote radio heads (RRH) with macro bases stations. Although the above example embodiments describe the steps as being performed by the network entities illustrated in FIGS. 1A and 1B (e.g., macro BSs), example embodiments are not limited thereto. For example, the above method steps may be performed by alternative network components.

Figure 6:
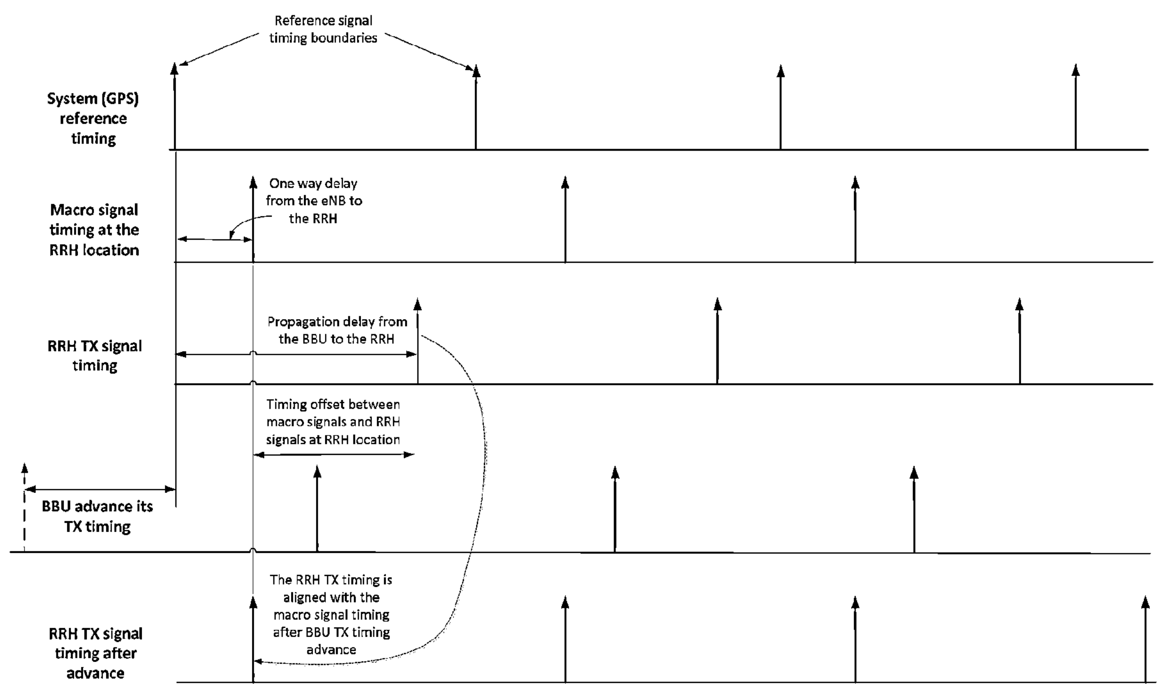
FIG. 6 illustrates a timing diagram according to an example embodiment.

FIG. 6 illustrates a timing diagram according to an example embodiment. As shown in FIG. 6 timing relations of different signals relative to the system time may be synchronized. The timing advance required at the BBU (e.g., BBU 150) may be the propagation delay (shown as OWD2 in FIG. 1B) from the BBU to the RRH (e.g., RRH 110B) via the fiber (e.g., Fiber obtic inter-connection 155) minus the propagation delay (shown as OWD1 in FIG. 1B) from the BS (e.g., macro BS 110A) to the RRH via air. If the geographic size of the macro cell is large, OWD1 may be an important factor in data transmissions. The BBU may connect to many RRH's overlaid with different macro cells. To achieve the synchronization over the entire system, for each RRH, the calibration procedures according to example embodiments may be performed to ensure their synchronization with the macro cells.

Alternative embodiments of the invention may be implemented as a computer program product for use with a computer system, the computer program product being, for example, a series of computer instructions, code segments or program segments stored on a tangible or non-transitory data recording medium (computer readable medium), such as a diskette, CD-ROM, ROM, or fixed disk, or embodied in a computer data signal, the signal being transmitted over a tangible medium or a wireless medium, for example, microwave or infrared. The series of computer instructions, code segments or program segments can constitute all or part of the functionality of the methods of example embodiments described above, and may also be stored in any memory device, volatile or non-volatile, such as semiconductor, magnetic, optical or other memory device.

While example embodiments have been particularly shown and described, it will be understood by one of ordinary skill in the art that variations in form and detail may be made therein without departing from the spirit and scope of the claims.

The invention being thus described, it will be obvious that the same may be varied in many ways. Such variations are not to be regarded as a departure from the invention, and all such modifications are intended to be included within the scope of the invention.

I claim:

1. A base band unit comprising:

a processor, the processor configured to, receive a first message from a base station, the first message including information identifying a remote radio head and a first time delay, the first time delay indicating a propagation time delay between a user equipment and the base station, receive a second message from a user equipment, the second message indicating the user equipment is associated with the remote radio head, receive a reference signal from the user equipment, the reference signal including a time stamp, determine a second time delay based on the time reference, the second time delay indicating a propagation time delay between the user equipment and the base band unit, determine a time value based on the first time delay and the second time delay, and transmit a data packet to the user equipment via the remote radio head, the transmitting being advanced in time by the time value.

2. The base band unit of claim 1, wherein the time value is equal to the second time delay minus the first time delay.

3. The base band unit of claim 1, wherein the processor is further configured to transmit a time advance value to the user equipment connected to the remote radio head, the time advance value being the first time delay plus the second time delay.

4. The base band unit of claim 1, wherein the processor is further configured to store a plurality of records for a plurality of remote radio heads, the plurality of records include the time value associated with the identity information for each remote radio head in a wireless network.

5. The base band unit of claim 4, wherein each remote radio head in the wireless network is overlaid with a plurality of different macro cells.

6. A wireless user equipment comprising:

a processor, the processor configured to, receive a signal indicating the user equipment is proximate to a remote radio head, transmit a first message to a base station, the message including identifying information associated with the remote radio head, transmit a reference signal to the base station, the reference signal including a first time reference, the first time reference indicating a transmission time from the user equipment to the base station, and receive a data packet from the remote radio head, a time advance associated with the transmission of the data packet being based on the first time reference.

7. The user equipment of claim 6, wherein the processor is further configured to, handover to the remote radio head after transmitting the first message, transmit a reference signal to a base band unit, the reference signal including a second time reference, the second time reference indicating a transmission time from the user equipment to the base band unit, and receive the data packet from the remote radio head such that the time advance associated with the transmission of the data packet is further based on the second time reference.

8. The user equipment of claim 6, wherein the processor is further configured to generate the indication signal based on one of a user input on a display of the user equipment and a geographic position of the user equipment as indicated by a global positioning system.

9. The user equipment of claim 6, wherein the processor is further configured to transmit a calibration message to the base station, the calibration message indicating the base station is to commence a remote radio head calibration.

10. The user equipment of claim 6, wherein the identifying information is one of a cell ID of the remote radio head and a reference signal offset of the remote radio head.

11. A base station comprising:

a processor, the processor configured to, receive a first message from a user equipment, the first message including identifying information associated with a remote radio head, receive a reference signal from a user equipment, the reference signal including a first time reference, the first time reference indicating a transmission time from the user equipment to the base station, determine a time delay associated with the remote radio head based on the first time reference, and transmit a second message to a base band unit, the message including the identifying information and the time delay.

12. The base station of claim 11, wherein the processor is configured to not instruct the user equipment to handover to the remote radio head.

13. The base station of claim 11, wherein the processor is further configured to, if there is a data transmission from the remote radio head to the user equipment, enable an almost blank subframe, and notify of a pattern associated with the almost blank subframe.

14. The base station of claim 11, wherein the processor is configured to determine the time delay based on a synchronized system time, the first time reference and a time the second message was received.

15. The base station of claim 11, wherein the processor is further configured to instruct the user equipment to handover to the remote radio head after the time delay from the base station to the remote radio head is determined.

* * * * *